US009773378B2

(12) United States Patent
Louie et al.

(10) Patent No.: US 9,773,378 B2
(45) Date of Patent: Sep. 26, 2017

(54) WAGERING GAME HAVING PLAYER-DIRECTED POPULATION OF A BONUS FEATURE

(71) Applicant: WMS Gaming Inc., Waukegan, IL (US)

(72) Inventors: Daniel P. Louie, Chicago, IL (US); Jamie W. Vann, Chicago, IL (US); Allon G. Englman, Chicago, IL (US)

(73) Assignee: Bally Gaming, Inc., Las Vegas, NV (US)

(*) Notice: Subject to any disclaimer, the term of this patent is extended or adjusted under 35 U.S.C. 154(b) by 248 days.

(21) Appl. No.: 14/490,881

(22) Filed: Sep. 19, 2014

(65) Prior Publication Data

US 2015/0087378 A1 Mar. 26, 2015

Related U.S. Application Data

(60) Provisional application No. 61/960,663, filed on Sep. 23, 2013.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ...... *G07F 17/3258* (2013.01); *G07F 17/3267* (2013.01); *G07F 17/34* (2013.01)

(58) Field of Classification Search
CPC ........... A63F 5/045; A63F 5/046; G07F 17/32
See application file for complete search history.

(56) References Cited

U.S. PATENT DOCUMENTS

| | | | | |
|---|---|---|---|---|
| 6,159,098 | A | 12/2000 | Slomiany et al. | |
| 6,224,483 | B1 * | 5/2001 | Mayeroff | G07F 17/32 463/16 |
| 6,241,607 | B1 | 6/2001 | Payne et al. | |
| 6,494,454 | B2 | 12/2002 | Adams | |
| 6,517,433 | B2 | 2/2003 | Loose et al. | |
| 6,533,273 | B2 | 3/2003 | Cole et al. | |
| 6,605,001 | B1 | 8/2003 | Tarantino | |
| 6,612,575 | B1 | 9/2003 | Cole et al. | |
| 6,702,671 | B2 | 3/2004 | Tarantino | |
| 6,780,109 | B2 | 8/2004 | Kaminkow | |
| 6,855,054 | B2 | 2/2005 | White et al. | |
| 7,090,579 | B2 | 8/2006 | Tarantino | |
| 7,094,147 | B2 | 8/2006 | Nakata et al. | |
| 7,144,322 | B2 | 12/2006 | Gomez et al. | |
| 7,192,345 | B2 | 3/2007 | Muir et al. | |
| 7,435,175 | B2 | 10/2008 | Fiden | |

(Continued)

FOREIGN PATENT DOCUMENTS

| | | | |
|---|---|---|---|
| GB | 2 097 160 | A | 10/1982 |
| GB | 2 372 132 | A | 8/2002 |
| WO | WO 98/20949 | A1 | 5/1998 |

*Primary Examiner* — Kevin Y Kim
(74) *Attorney, Agent, or Firm* — Nixon Peabody LLP

(57) ABSTRACT

A gaming system presents a wagering game that includes a bonus wheel having a plurality of wheel segments. A player directs the placement of at least one award marker on a wheel segment of the plurality, and the wagering game randomly selects a winning wheel segment of the plurality.

18 Claims, 10 Drawing Sheets

(56) References Cited

U.S. PATENT DOCUMENTS

| | | | |
|---|---|---|---|
| 7,513,828 | B2 | 4/2009 | Nguyen et al. |
| 7,713,122 | B2 | 5/2010 | Pacey |
| 7,780,519 | B2 | 8/2010 | Gomez et al. |
| 8,057,303 | B2 | 11/2011 | Rasmussen et al. |
| 8,226,459 | B2 | 7/2012 | Barrett et al. |
| 2002/0055381 | A1 | 5/2002 | Tarantino |
| 2005/0239536 | A1* | 10/2005 | Ogiwara ................. G07F 17/32 463/17 |
| 2009/0011827 | A1 | 1/2009 | Englman et al. |
| 2014/0024437 | A1 | 1/2014 | Vann et al. |

* cited by examiner

WAGERING GAME HAVING PLAYER-DIRECTED POPULATION OF A BONUS FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a wagering game that includes a bonus feature populated with elements according to a player's directions.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

SUMMARY OF THE INVENTION

According to another aspect of the invention, a computer-implemented method in a gaming system comprises receiving a wager input indicative of an initial wager initiating a wagering game. The method displays a bonus wheel with a plurality of wheel segments and a stop indicator that indicates a winning wheel segment. The method receives selections by the player of wheel segments of the plurality on which to place award markers, and further spins and stops the bonus wheel to indicate a randomly selected winning segment. In response to an award marker being on the winning segment, the method awards the player an award associated with the award marker.

According to one aspect of the present invention, a gaming system comprises instructions that, when executed by one or more processors, cause the gaming system to receive a wager input that initiates a wagering game and displays a bonus wheel with a plurality of wheel segments and a stop indicator that indicates a winning wheel segment. The gaming system further receives initial selections by the player of a primary award marker and a wheel segment of the plurality on which to place the primary award marker. After receiving the initial selections, the gaming system spins and stops the bonus wheel to indicate a randomly selected winning wheel segment and, in response to the primary award marker being on the winning segment, awards the player an award associated with the primary award marker.

According to yet another aspect of the invention, computer-readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1:
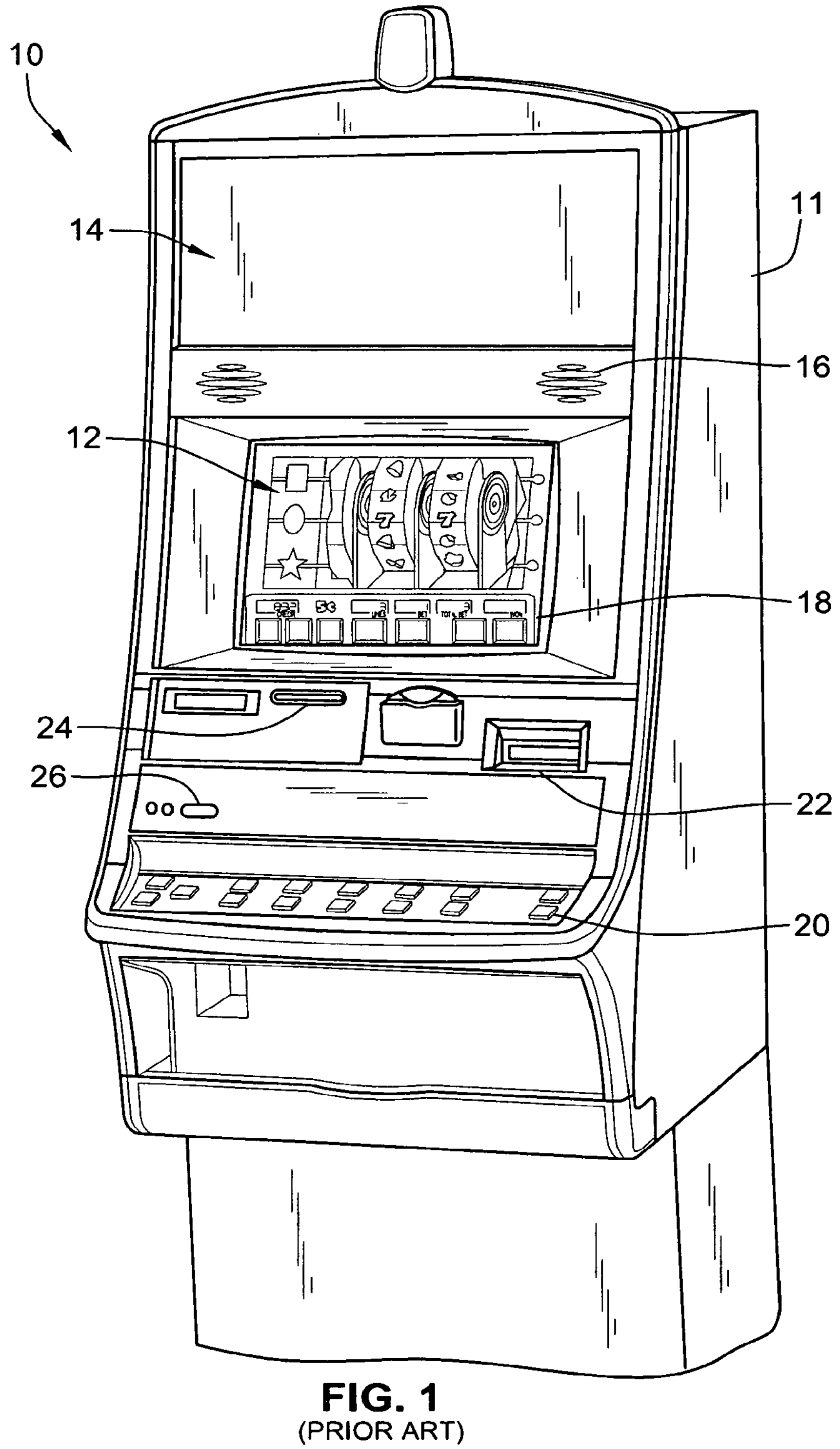
FIG. 1 (PRIOR ART)
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
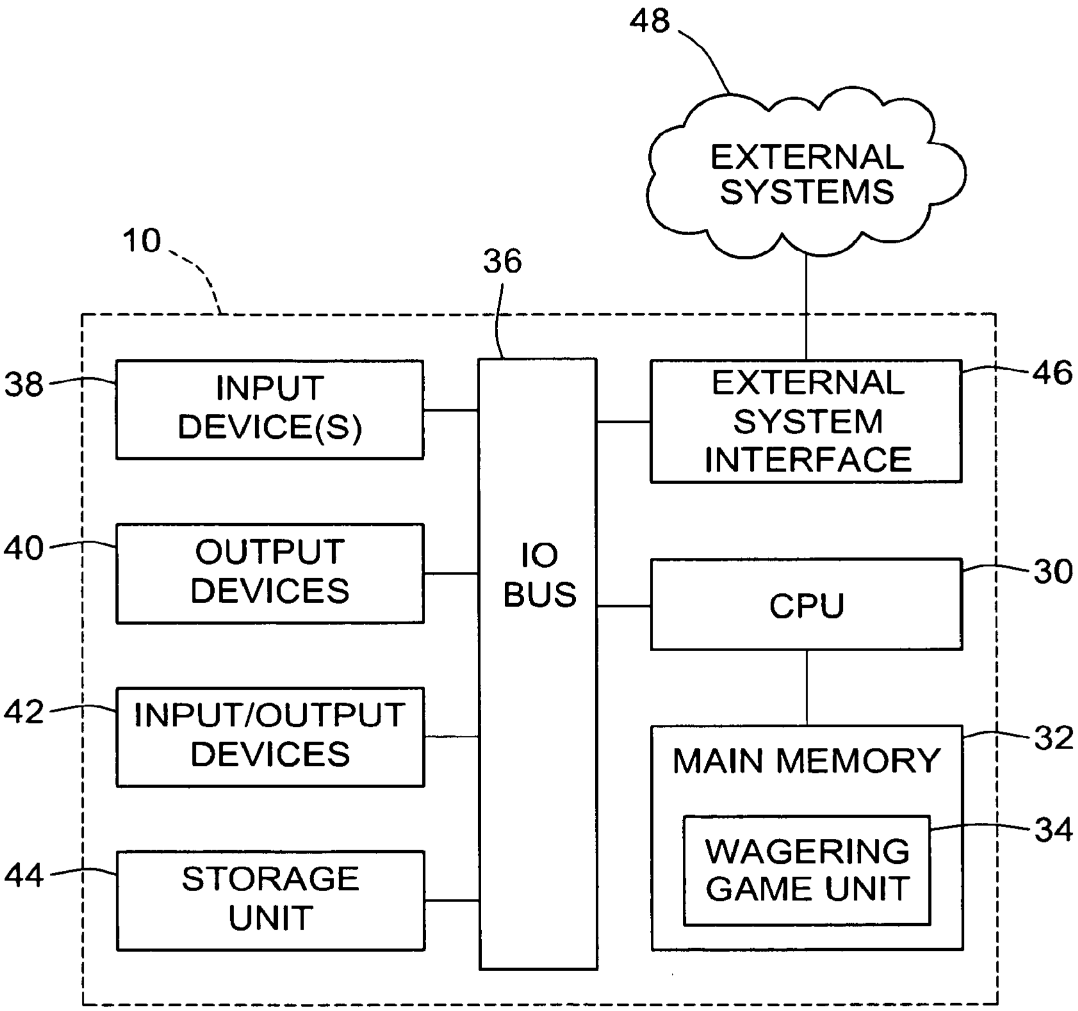
FIG. 2 (PRIOR ART)
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
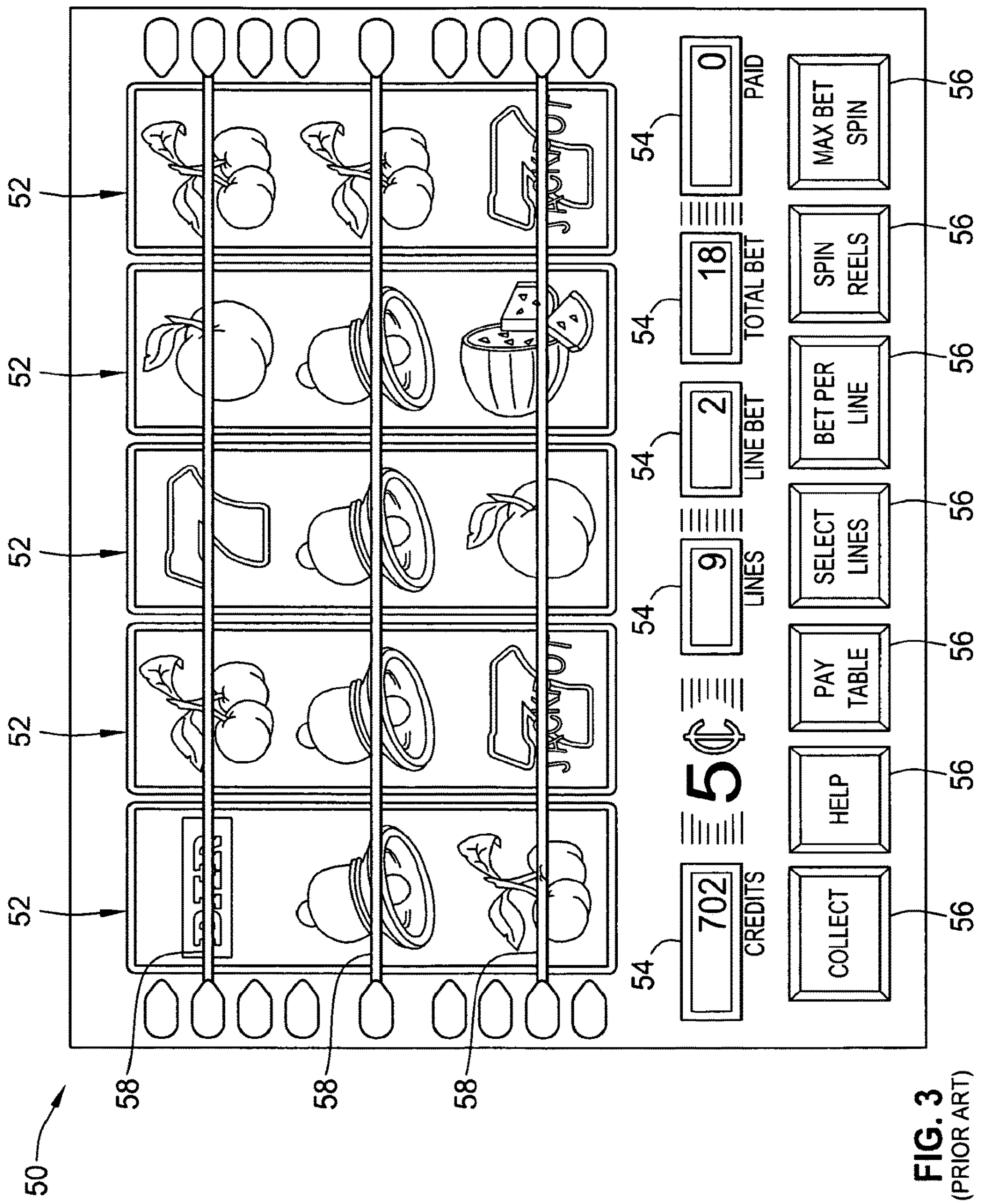
FIG. 3 (PRIOR ART)
FIG. 3 is an image of an exemplary basic-game screen of a wagering game displayed on a gaming terminal, according to an embodiment of the present invention.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving an input indicative of a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
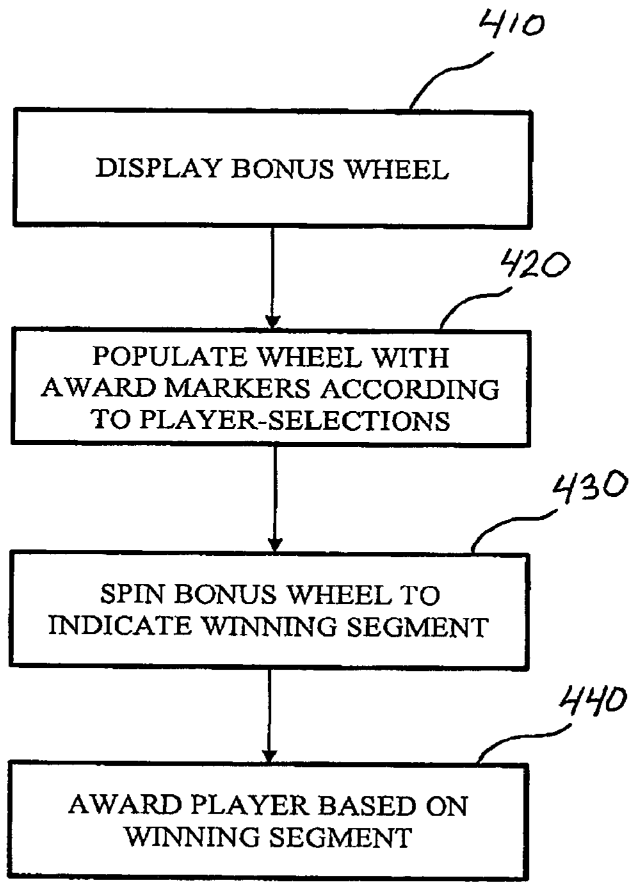
FIG. 4 is a flowchart for an algorithm that corresponds to instructions executed by one or more processors in accord with at least some aspects of the disclosed concepts.

Referring now to FIG. 4, there is shown a flowchart of operations of an embodiment of the novel wagering game in which a player interactively directs the population of a bonus feature in the hope of achieving an award. At step 410, the wagering game displays a bonus feature, in this case, a bonus wheel with a plurality of empty wheel segments. At step 420, the wagering game receives a selection from a player of a wheel segment of the plurality which places an award marker on the selected wheel segment. In some cases, the player also selects the award marker that is placed on the selected wheel segment; in others, the computer or gaming system may select the award marker. Also, in some embodiments, the player may select more than one wheel segment of the plurality, and an award marker may be placed on each selected wheel segment. In addition, the specification envisions embodiments in which an award associated with an award marker is hidden from the player, and embodiments in which an award associated with an award marker is revealed to the player. An award may be revealed to the player before, during, and after the player selects a wheel segment for the award marker associated with the award. In some embodiments, additionally or alternatively to a player placing award markers on a bonus wheel, the player may place stop indicators (such as those described hereafter with respect to FIG. 10) at desirable locations around the periphery of a bonus wheel.

Here and throughout the specification, some award markers are described as being placed on wheel segments that are selected by the player. Such award markers may be referred to as player-placed award markers, or award markers placed on player-selected wheel segments. These and other variations should be understood to refer to award markers placed on wheel segments that are selected or chosen by the player. Other award markers disclosed herein are placed on wheel markers that are selected by computer processing according to rules of the wagering game. These other award markers may be herein referred to as computer-placed award markers, system-placed award markers, award markers placed by the wagering game or the embodiment, and other similar expressions, and should be understood to refer to award markers placed on wheel segments that have been selected by one or more processors executing wagering-game instructions.

The random selection of a winning wheel segment may be affected by weights applied to some or all wheel segments of the plurality of wheel segments. As used herein, a "weighted" wheel segment has an adjusted probability of being randomly selected, and the adjusted probability may be proportional to the weight applied to the wheel segment. Bonus wheel segments may be weighted according to various criteria, and may also be equally weighted (or unweighted). The wheel segments may have weights that vary from game to game depending on various criteria such as location on the bonus wheel and relative position with respect to the award markers on other wheel segments. Preferably, the sum of the weights of the plurality of wheel segments of a bonus reel will be constant, although the specification envisions embodiments in which the sum of the weights may vary.

In one embodiment, a wheel segment of the bonus wheel may be weighted according to an award value associated with an award marker that is placed on the wheel segment. For example, a wheel segment carrying an award marker associated with a low-value award may be heavily weighted, thus increasing the probability of awarding the low-value award. Similarly, a wheel segment that awards a high-value award may be lightly weighted so that the probability of awarding the high-value award is in keeping with the programmed payback percentage of the wagering game. In some embodiments, wheel segment weights may be revealed to the player in various ways and at different times during the wagering game. In other embodiments, weights may not be revealed to the player. The specification envisions various combinations and variations of the abovementioned weighting examples that are in keeping with the principles disclosed herein.

In some embodiments, a weight assigned to a wheel segment may be based, at least in part, on a relative position of award markers placed on other wheel segments of the plurality of wheel segments. For example, the wagering game may heavily weight a low-value award marker that is adjacent to a high-value marker that is lightly weighted.

The specification includes descriptions of embodiments of the wagering game that utilize a bonus wheel as a visual representation of the bonus feature. It should be noted that the specification also envisions other types of visualizations and presentations of bonus features that retain the nature and spirit of the disclosed invention. For example, the elements disclosed herein could be applied to a horse-racing bonus feature in which award markers are placed on different horses and a randomly selected horse wins the race. Alternatively, the elements disclosed herein could be applied to a trail-based feature. These and other themed bonus features that include elements that are similar to those disclosed herein are considered to fall within the general principles of the disclosed invention.

Returning now to FIG. 4, at step 430, after the player has placed award markers on one or more player-selected wheel segments, the wagering game may spin the bonus wheel and stop the bonus wheel at a randomly selected winning segment of the plurality of wheel segments. The winning segment may be indicated by which wheel segment aligns with a wheel stop indicator or pointer that is positioned at the periphery of the bonus wheel. At step 440, the player may be awarded an award associated with the award marker that is on the winning segment. The wagering game, as described above and in various other embodiments, provides the player with a sense of control by enabling the player to choose the placement of an award marker on the bonus wheel.

Prior to stopping the bonus wheel to indicate the winning wheel segment, the wagering game may place additional award markers on unselected wheel segments. Such placements may be randomly determined or may be determined by an algorithm. In some embodiments, placement of an additional award marker may be determined by an optimizing algorithm that takes into account the relative positions of the player-selected wheel segments. In an embodiment, an optimizing algorithm places one or more award markers on computer-selected wheel segments such that a distribution of awards associated with the placed award markers is substantially even with respect to award values associated with the placed award markers. "Substantially," as used in conjunction with an optimizing algorithm, is intended to allow for minor variations and inequalities that may arise due to a number of available wheel segments, a number of player-selected wheel segments, and other variations that may preclude the possibility of a perfectly "even" distribution. In any event, an optimizing algorithm aims to achieve the most even distribution of award values as is possible given a set of preceding events.

For example, if the player places a concentration of award markers associated with higher-value awards, an optimizing algorithm may balance the player-selected concentration by placing other award markers associated with high-value awards on opposite wheel segments. Such optimizing may enhance the excitement of the wagering game by eliminating "dead spots" on the bonus wheel. Dead spots result when groups of adjacent or near-by wheel positions are either substantially occupied by low-value award markers. Large areas of low-value awards may cause players to lose interest as the bonus wheel spins through that portion of the wheel. Various methods and types of algorithms for optimizing award marker distribution of a bonus feature are envisioned by the specification so as to keep the player move actively engaged throughout the course of the wheel spin and to create more "near miss" opportunities on the bonus wheel.

Figure 5:
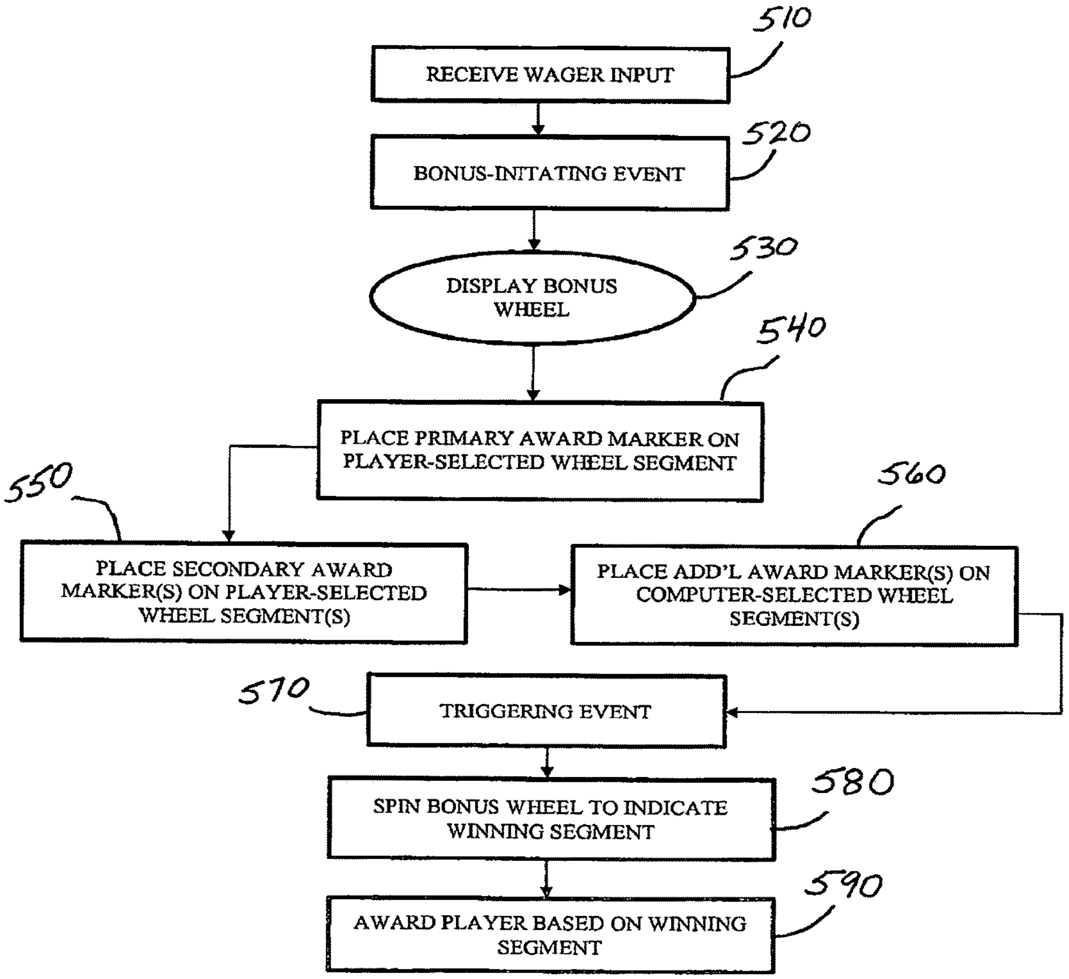
FIG. 5 is another flowchart for an algorithm that corresponds to instructions executed by one or more processors in accord with at least some aspects of the disclosed concepts.

In FIG. 5, a flowchart of another embodiment of the wagering game illustrates further elements that may be included in the wagering game to enhance the player's gaming experience. For example, in this embodiment, the bonus wheel is part of a bonus feature that is triggered during play of a basic game. At step 510, the wagering game receives a wager input from the player to initiate the basic game. During the basic game, at step 520, a bonus-initiating event occurs and the wagering game initiates the bonus feature and displays, at step 530, a bonus wheel that includes a plurality of wheel segments and a stop indicator positioned along the periphery of the bonus wheel. At step 540, the bonus game allows the player to place a primary award marker associated with a particular primary award on a wheel segment. In some embodiments, the primary award may have the highest award value, may provide the player with the highest probability of winning an award, and may have other distinctive benefits in comparison to other awards in the bonus game. For example, the primary award may be a progressive award. In other embodiments, the primary award marker may be the same as other award markers.

At step 550, an embodiment may allow the player to place one or more secondary award markers on wheel segments of the plurality. It is preferred that the secondary award markers are associated with lower value awards than the primary award marker, however, it is also envisioned that there may be other or no distinctions between primary and secondary award markers except for their order of placement. In one embodiment, the primary and secondary award markers are associated with a plurality of different progressive jackpot awards. The primary award marker may award the top value progressive jackpot and the secondary award markers may award other progressive jackpots of decreasing value. When such an embodiment employs a weighted bonus wheel, a wheel segment weight may reflect which progressive jackpot is placed on the wheel segment, the relative position of the wheel segment with respect to the top-value progressive award marker, and combinations and variations thereof.

Wagering game probabilities may be adjusted in various ways. For example, a wheel segment with a high probability of being randomly selected may extend across more of the bonus wheel than a low-probability wheel segment, so that the high-probability segment occupies a greater portion of the bonus wheel periphery. Also, a group of adjacent wheel segments may be linked or combined such that selecting any of the group selects all of the group. In one embodiment, the probability of selecting a particular wheel segment may be altered by adding or removing other wheel segments from the bonus wheel.

Both probabilities and award values may vary according to an amount wagered by the player. For example, a player who wagers a maximum amount may receive award multipliers to increase any awards they achieve during the wagering game. Alternatively, a maximum wager may increase the probability of winning a top award or decrease the probability of winning a low-value award.

After placing the award markers on player-selected wheel segments, there may remain one or more unselected wheel segments of the plurality of wheel segments. At step 560, some embodiments of the wagering game may automatically place additional award markers on some or all of the remaining unselected wheel segments. Various optimizing algorithms may be executed to determine the placement of the additional award markers, particularly if at least one of the additional award markers is associated with an award having a different value from another additional award. For example, one embodiment may place an extra primary award marker on an unselected wheel segment to provide the player with an extra opportunity to win the primary award, and may determine which wheel segment gets the extra primary award marker based in part on the relative position of one or more of the player-selected wheel segments. In one embodiment, an optimizing algorithm may first attempt to place an extra primary award mark on a wheel segment diametrically opposite from the player-placed primary award marker. If the opposite wheel segment is already occupied by an award marker, the optimizing algorithm may look for an unoccupied next-adjacent wheel segment, a second-next-adjacent wheel segment, and so on, at which to place the extra primary award marker. In another embodiment, an optimizing algorithm may place two medium-value award markers on wheel segments that are approximately opposite a player-placed high-value award marker. Other variations of an optimizing algorithm are envisioned by the specification.

At step 570, a triggering event occurs during the wagering game that causes the wagering game to spin (at step 580) the bonus wheel to indicate a randomly selected winning segment. Various triggering events may be employed, including triggering the bonus wheel after an award marker is placed on the last unselected wheel segment. Other trigger events may occur randomly, may be based on a randomly selected outcome of a basic game, and may be based on elapsed time or on accrued or wagered credits, etc.

After the bonus wheel is spun, the wheel eventually stops with the stop indicator aligned with a randomly selected winning segment of the plurality of wheel segments. At step 590, the winning segment is evaluated for potential awards. If an award marker has been placed on the winning segment, either by the player or by the wagering game, the player may be awarded an award associated with the award marker. The possible awards may include credits, a progressive jackpot, a credit multiplier, free spins, additional bonus features, etc., and may have various award values. Awards may comprise monetary value, virtual currency or benefits, and combinations thereof, as determined by the wagering game rules. An award may have a zero or null value, and may actually be detrimental to the player (e.g., a "pooper" or feature-terminating award).

The wagering game as described herein provides many possible avenues for generating excitement and engaging the attention of a player. For example, in an embodiment, the player may be allowed to place award markers on a plurality of player-selected wheel segments, with each award marker representing a portion of the player's initial wager. In such an embodiment, the player not only selects which wheel segments they think may be winners, but can also concentrate or distribute their wager across the wheel segments. In one case, a player may risk the entire wager on a particular region of the bonus wheel by clumping their award markers together (e.g., on adjacent wheel segments). Alternatively, the player may spread their risk by scattering award markers throughout the bonus wheel. The specification envisions embodiments in which multiple award markers may be placed on a single wheel segment to yield multiple awards. If a player has a feeling or "hunch" that a particular region of the bonus wheel is likely to hit, the player may concentrate their markers in that region to capitalize on that hunch.

Other embodiments may introduce additional elements to facilitate the abovementioned principles. In one embodiment, a player may be presented with multiple bonus wheels that provide a variety of wagering options, probabilities, and paytables. For example, in a wager-dependent embodiment, a player placing the maximum wager may proceed to populate a bonus wheel having fewer wheel segments (i.e., higher probability of an award) than the bonus wheel provided to a low-wager player. In another embodiment, a player may select between a smaller bonus wheel with high-value awards and a larger bonus wheel with lower-value awards, therefor selecting to play a high-volatility game or a low-volatility game. Other, similar variations are envisioned by the specification as being within the principles of the invention.

Similarly, in embodiments having award markers with different values, a player may place their highest-value marker on a particular wheel segment and surround it with lower-value award markers in an effort to benefit from a near miss (e.g., if the bonus wheel stops just before or after the high-value marker, the player still wins with a lower-value marker).

Figure 6:
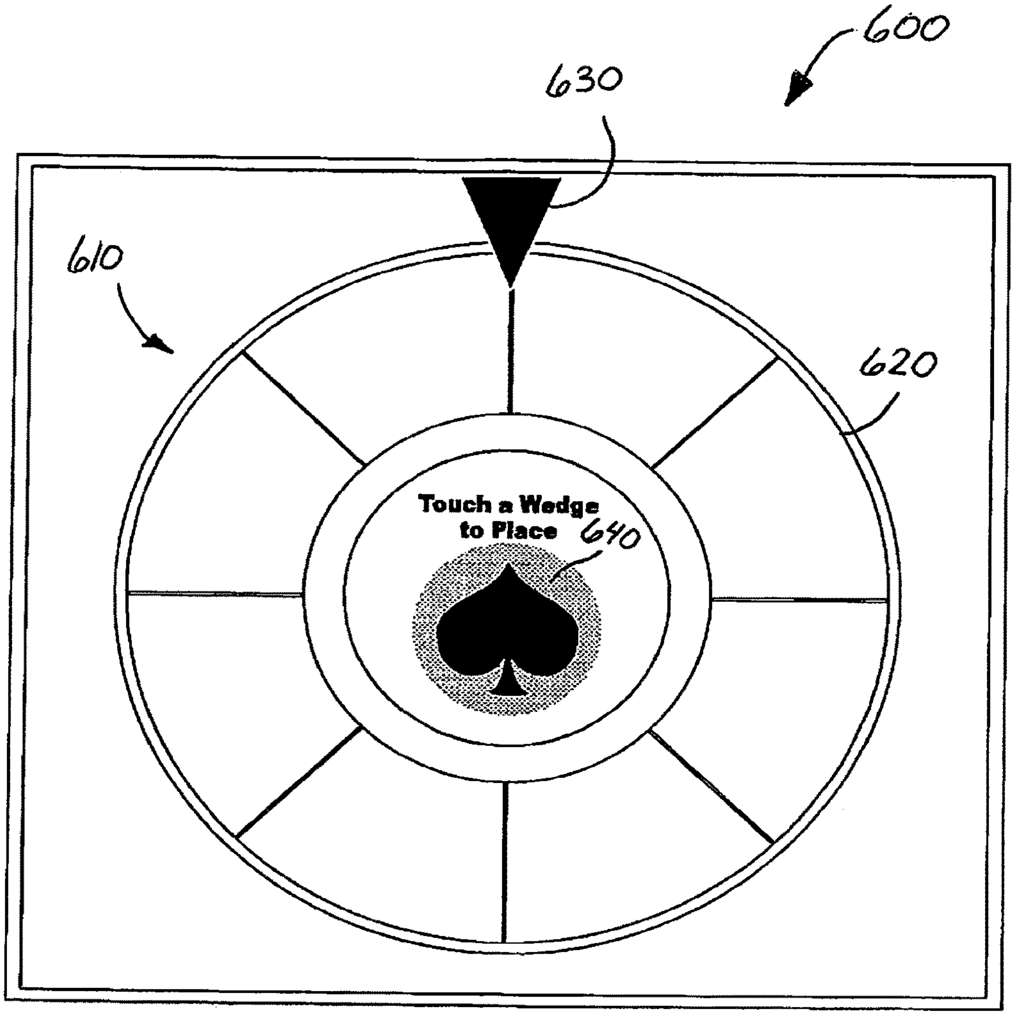
FIG. 6 is an exemplary initial game screen of a bonus feature, according to an embodiment of the present invention.

Referring now to FIG. 6, there is shown an illustration of a game screen of an embodiment. The game screen 600 includes a bonus wheel 610 having a plurality of selectable wheel segments 620. Also shown is a stop indicator 630. In this embodiment, the wagering game prompts the player to place a primary award marker 640 on a selected wheel segment.

Figure 7:
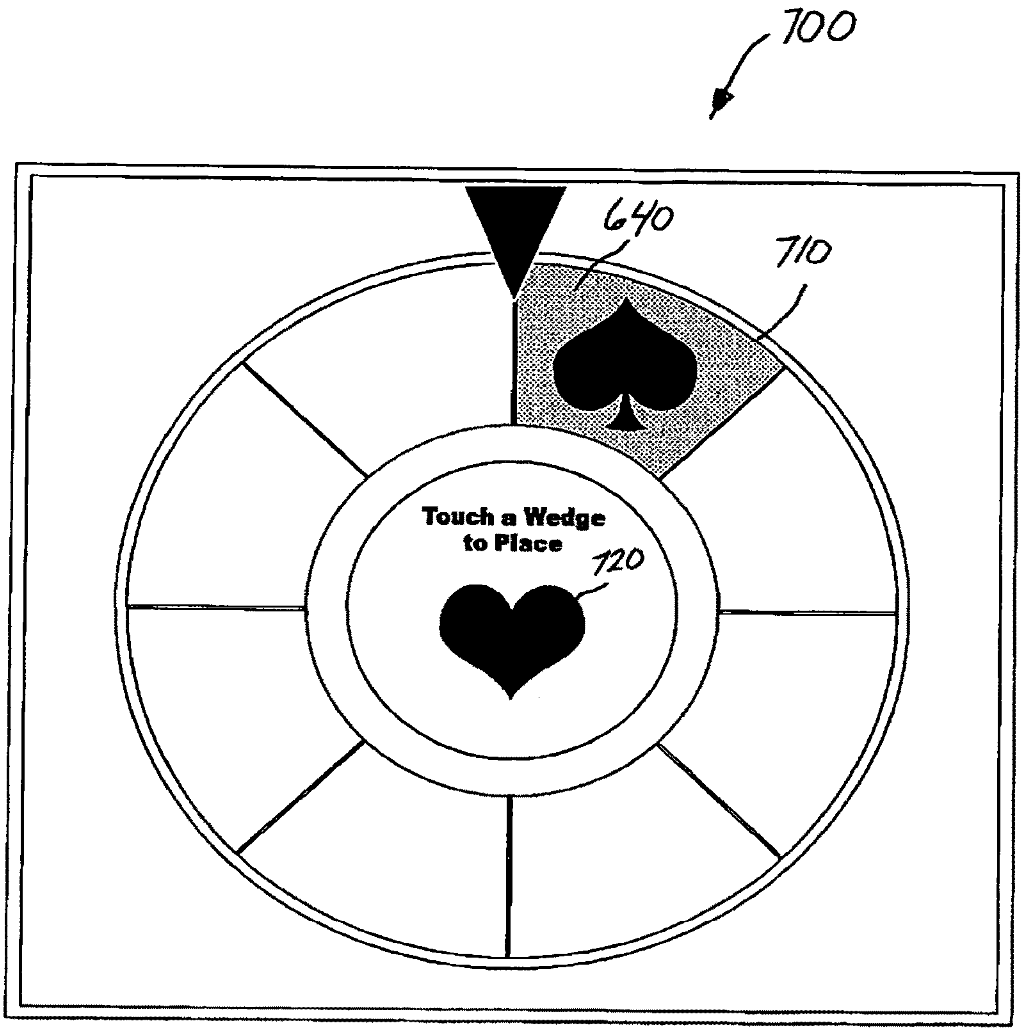
FIG. 7 is an exemplary game screen of a bonus feature after a player has placed a primary award marker on a wheel segment.

In FIG. 7, game screen 700 shows the embodiment after the player has placed the primary award marker 640 on wheel segment 710. The embodiment prompts the player to place a secondary award marker 720 on an unselected wheel segment of the bonus wheel. As mentioned previously, primary and secondary award markers may be associated with different award values, and in this case the primary award has the highest award value and the secondary awards have lower award values. In some embodiments, the primary and secondary award markers may have the same value, and may differ in various other ways.

Figure 8:
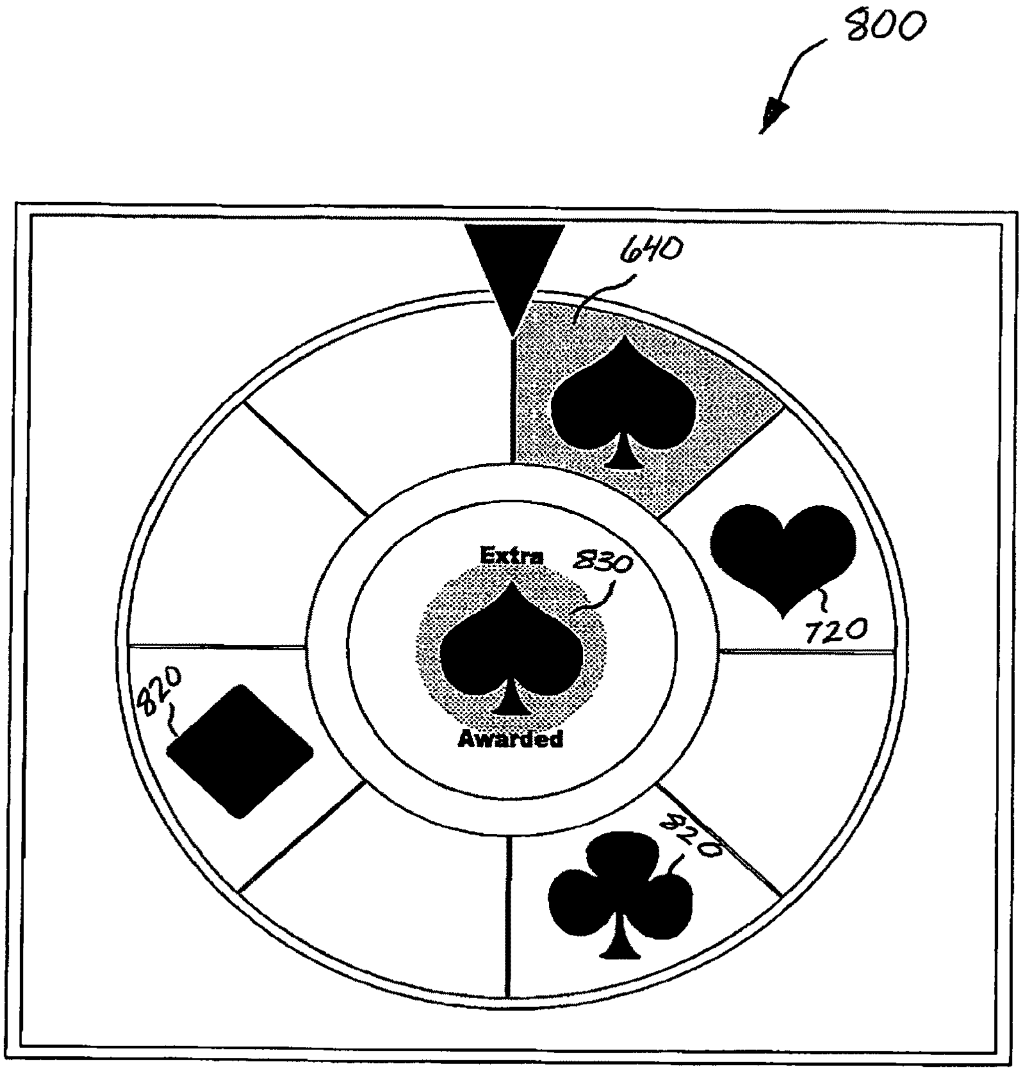
FIG. 8 is an exemplary game screen of a bonus feature after a player has placed secondary award markers on wheel segments.

In FIG. 8, the game screen 800 shows the embodiment after the player has placed the primary award marker 640 and three secondary award markers 720, 820, 820 on various player-selected wheel segments. The embodiment has awarded the player an extra primary award marker 830 which will be placed on an unselected wedge chosen by the wagering game and based on the relative positions of the already-placed award markers. While it is preferred that the extra primary award marker is placed according to an optimizing algorithm, it is envisioned by the specification that some embodiments may place the extra primary award marker according to the player's selection, may place the extra primary award marker randomly, and may utilize a non-optimizing algorithm that bases placement on various criteria.

Figure 9:
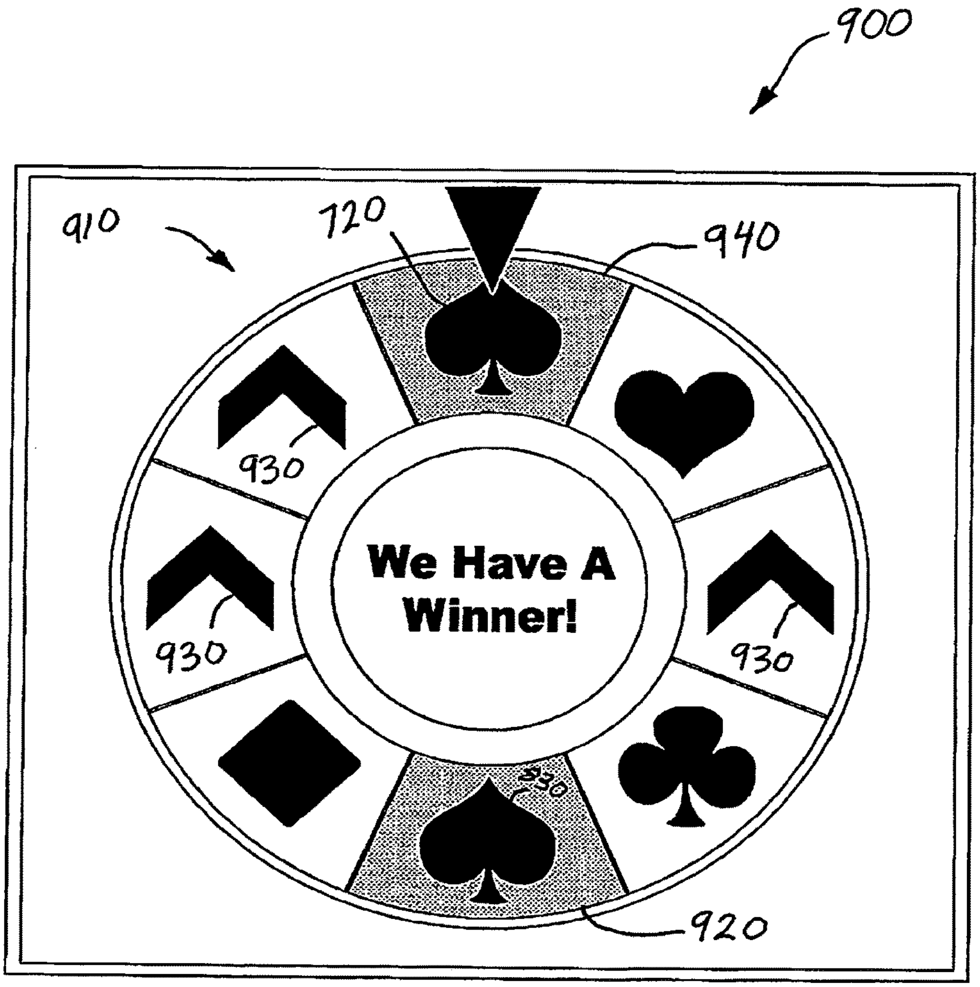
FIG. 9 is an exemplary game screen of a bonus feature after the bonus wheel has spun and stopped to indicate a winning wheel segment.

In FIG. 9, game screen 900 displays the bonus wheel 910 after the embodiment has placed the extra primary award marker 830 on wheel segment 920, filled the remaining unselected wheel segments with additional award symbols 930, and spun and stopped the bonus wheel. The stop indicator shows that wheel segment 940 has been randomly selected to be the winning segment. Since the player had previously placed the secondary award marker 720 on wheel segment 940, the embodiment will award the player the award value associated with award marker 720.

As seen in FIG. 9, the illustrated embodiment fills all the wheel segments of the bonus wheel with award symbols of some kind, however, it is envisioned by the specification that some embodiments may proceed with empty wheel segments that provide no award value to the player if they are selected to be winning segments. Alternatively, empty wheel segments may award a consolation award.

Figure 10:
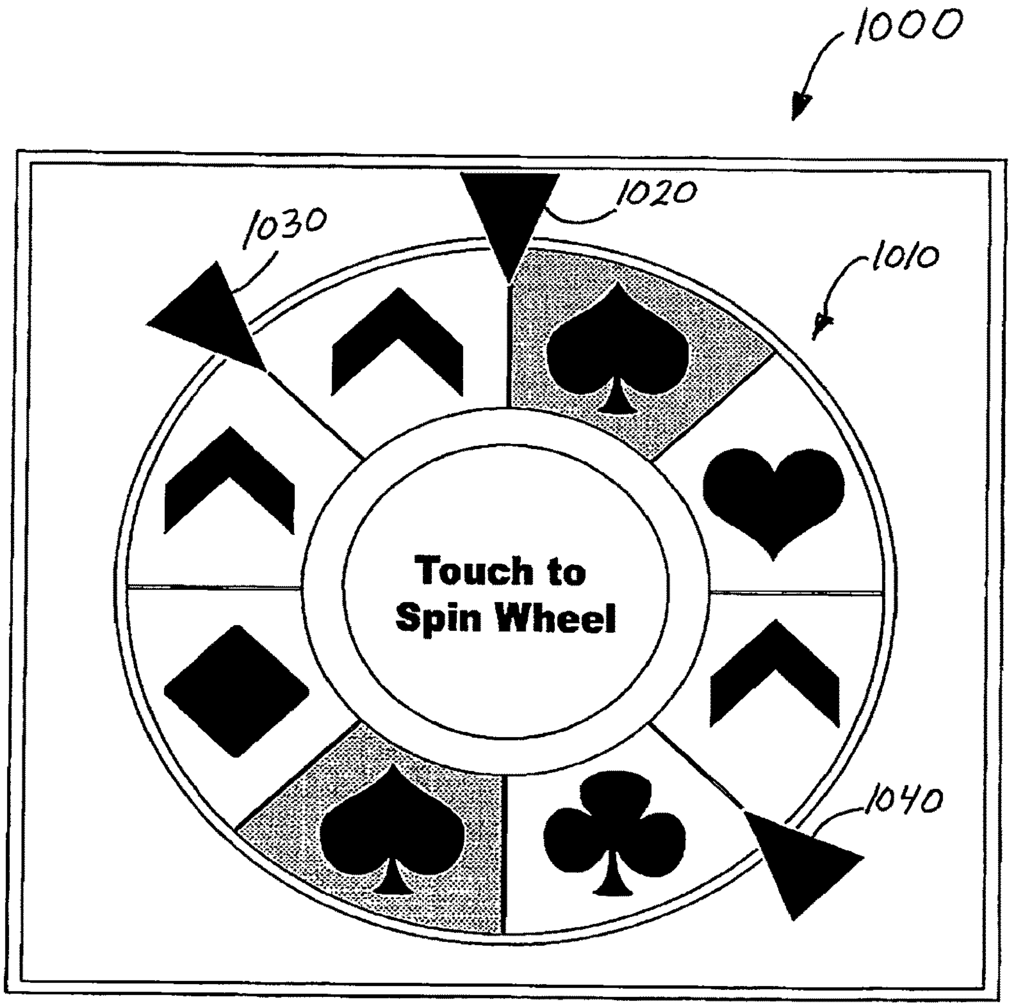
FIG. 10 is an exemplary game screen of a bonus feature that includes multiple stop indicators.

In an embodiment of the wagering game, a player may select locations for one or more stop indicators. For example, the player may place an award marker on a particular wheel segment and move the stop indicator to a player-selected location on the periphery of the wheel. Thus, the player may exercise control over the location of the winning segment—if the player feels the bottom of the wheel is more likely to provide an award they may move the stop indicator to the bottom. In another embodiment, the bonus wheel may be presented with multiple stop indicators in different locations and the player may select one stop indicator as the active indicator. As shown in FIG. 10, game screen 1000 illustrates an embodiment in which three stop indicators 1020, 1030, 1040 are displayed with the bonus wheel 1010. The embodiment of FIG. 10 may allow the player to activate one of the displayed stop indicators (deactivating the remaining stop indicators), and may, alternatively, spin the bonus wheel with all three stop indicators to provide multiple awards. Mixing player-selected wheel segments and player-selected locations for stop indicators may increase the excitement of the wagering game for the player.

In an embodiment, a player may group their award markers on adjacent wheel segments and also group their stop indicators at adjacent locations to provide the possibility of the group of award markers aligning with the group of stop indicators (and awarding the player for multiple winning segments). Another embodiment may allow the player to position multiple stop indicators at a single location on the periphery of the bonus wheel and then apply an award multiplier to the winning segment at the single location.

In another embodiment of the invention, a bonus wheel or other bonus feature may be populated by the player over the course of successive instances of the wagering game. In such an embodiment, a partially populated bonus wheel may persist over the successive instances so that the bonus wheel is restored to the preceding, partially populated state for display in a subsequent instance. For example, referring to FIG. 7, if the current instance of the wagering game ends before the bonus wheel is spun, the bonus wheel may be stored in memory in the current state with only the primary award marker in place on the bonus wheel. When the player initiates a subsequent instance of the wagering game (i.e., by placing another wager to initiate the wagering game), the bonus wheel is restored in the subsequent instance with the primary award marker already placed on a wheel segment. The player may continue in the subsequent instance by placing a secondary award on a wheel segment, may trigger a spin of the bonus wheel, and may proceed differently according to the rules of the embodiment.

Persistent-state embodiments, such as described above, may include additional features and variations to increase player enjoyment and excitement. A persistent-state embodiment may include a bonus-initiating event that occurs during play of a basic game to initiate the bonus wheel feature, and a triggering feature that causes the bonus wheel to spin and stop at a randomly selected wheel segment. In such an embodiment, similar to the embodiment depicted in FIG. 5, the player plays a basic wagering game until an occurrence of the bonus-initiating event causes a transition to the bonus feature. If the player is playing for the first time, an empty bonus wheel may be displayed and the player may be allowed to place one or more award markers on wheel segments. However, if the player had previously played an instance of the wagering game which terminated prior to spinning the bonus wheel, a bonus wheel may be displayed in the partially filled state at which the previous instance concluded. The player continues to play the bonus feature in the subsequent instance with the partially filled bonus wheel, perhaps continuing to place award markers on the bonus wheel until an occurrence of a triggering event that causes the bonus wheel to spin and stop at a winning segment.

Spinning the bonus wheel and awarding the player would typically result in removing all the award markers from the bonus wheel and starting fresh, however, the specification envisions embodiments that may proceed in different ways. For example, spinning the bonus wheel may result in removing only some of the award markers, changing the award markers to another form, and changing the number of wheel segments in the bonus wheel, as well as combinations and variations of the above.

In yet another embodiment, the bonus feature may be presented as a community game with multiple participating players. A community-game embodiment may include each participating player making selections that populate a bonus wheel or other visual manifestation with award markers, icons, and other indicia. At some point in the community game, the bonus wheel may be spun and stopped to indicate a randomly selected outcome, and the player who made the selection that corresponds to the selected outcome may be awarded with an associated award. The participating players may make selections in turn, randomly, or in a varying order, according to the rules of the particular embodiment. A community-game embodiment may incorporate various abovementioned elements of the wagering game, and combinations and variations thereof.

FIGS. 4 and 5, described by way of the examples above, represent algorithms that correspond to at least some instructions executed by the CPU 30 in FIG. 2 to perform the above described functions associated with the disclosed concepts.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A computer-implemented method of conducting a wagering game that populates a bonus feature according to player inputs, the method comprising:

detecting, via one of one or more input devices, a physical item associated with monetary value that establishes a credit balance displayed on a credit meter;

receiving, via at least one of the one or more input devices, a wager input indicative of an initial wager from a player drawn on the credit balance to initiate the wagering game;

displaying, via a display device, a bonus wheel having a plurality of wheel segments and at least one stop indicator located at a periphery of the bonus wheel that indicates a winning wheel segment;

receiving, via at least one of the one or more input devices, one or more selections by the player of one or more of the plurality of wheel segments, wherein an award marker is placed on the one or more player-selected wheel segments;

placing, via at least one of the one or more processors and prior to spinning the bonus wheel to indicate a winning wheel segment of the plurality of wheel segments, one or more additional award markers on one or more unselected wheel segments of the plurality in accordance with an algorithm and based on relative positions of the player-selected wheel segments;

spinning and stopping the bonus wheel to indicate, via the at least one stop indicator, a randomly selected winning segment; and in response to any award marker being placed on the randomly selected winning segment, awarding the player an award associated with the award marker placed on the randomly selected winning segment.

2. The computer-implemented method of claim 1, wherein the player further selects the award marker to be placed on at least one of the player-selected wheel segments.

3. The computer-implemented method of claim 1, wherein a first wheel segment of the plurality of wheel segments is weighted according to the award marker placed on the first wheel segment such that a probability of randomly selecting the first wheel segment of the plurality of wheel segments is at least partly determined by the weight of the first wheel segment.

4. The computer-implemented method of claim 1, wherein the player-selected wheel segment risks a separate portion of the initial wager such that a value of an award resulting from the player-selected wheel segment is related to the corresponding separate portion of the initial wager.

5. The computer-implemented method of claim 1, wherein a number of player selections of wheel segments is variable, and wherein a value of an award associated with the one or more player-selected wheel segments varies in proportion to the number.

6. The computer-implemented method of claim 3, wherein a total weight of the plurality of wheel segments is the same for all combinations of player-selected segments.

7. The computer-implemented method of claim 1, wherein the algorithm is an optimizing algorithm that places the one or more additional award markers on selected wheel segments such that a distribution of awards associated with the one or more additional award markers is substantially even across the bonus wheel with respect to award values associated with the additional award markers.

8. A gaming system configured to conduct a wagering game that populates a bonus feature according to player inputs, the gaming system comprising:

one or more input devices;

one or more display devices;

one or more processors; and one or more memory devices storing instructions that, when executed by at least one of the one or more processors, cause the gaming system to:

detect, via one of the one or more input devices, a physical item associated with monetary value that establishes a credit balance displayed on a credit meter;

receive a wager input indicative of a wager from a player drawn from the credit balance to initiate the wagering game;

display a bonus wheel having a plurality of selectable wheel segments and at least one stop indicator located at a periphery of the bonus wheel that indicates a winning wheel segment;

receive initial selections by the player of a primary award marker for placement on a wheel segment of the plurality of selectable wheel segments, after receiving the initial selections and prior to spinning the bonus wheel to indicate a winning wheel segment of the plurality of selectable wheel segments, place one or more additional award markers on one or more unselected wheel segments of the plurality of wheel segments according to an optimizing algorithm that places the one or more additional award markers so as to distribute any high-value award markers as evenly as possible;

spin and stop the bonus wheel to indicate, via the at least one wheel stop indicator, a randomly selected winning segment; and in response to the primary award marker being placed on the randomly selected winning segment, award the player an award associated with the primary award marker.

9. The gaming system of claim 8, wherein the instructions further cause the gaming system to:

prior to spinning the bonus wheel to indicate a winning wheel segment, receive from the player one or more subsequent selections of one or more secondary award markers for placement on corresponding other wheel segments; and in response at least one of the one or more secondary award markers being on the randomly selected winning segment, award the player an award associated with the at least one of the one or more secondary award markers.

10. The gaming system of claim 8, wherein the instructions further cause the gaming system to move, prior to spinning the bonus wheel to indicate a winning wheel segment and based on a stop-location selection by the player, the at least one stop indicator to a player-selected location on the periphery of the bonus wheel.

11. The gaming system of claim 8, wherein the at least one stop indicator includes a plurality of stop indicators, and wherein the instructions further cause the gaming system to, prior to spinning the bonus wheel to indicate a winning wheel segment, receive a selection from the player of a stop indicator of the plurality of stop indicators that enables the player-selected stop indicator to indicate a randomly selected winning segment, and disables at least one unselected stop indicator.

12. The gaming system of claim 8, wherein the at least one stop indicator includes a plurality of stop indicators, and wherein the instructions further cause the gaming system to move, prior to spinning the bonus wheel to indicate a winning wheel segment and based on stop-location selections by the player, the stop indicators of the plurality of stop indicators to one or more locations on the periphery of the bonus wheel such that, after stopping the wheel, the plurality of stop indicators indicate a plurality of randomly selected winning wheel segments.

13. The gaming system of claim 12, wherein each stop-location selection by the player risks a separate portion of the initial wager such that a value of an award resulting from a selected stop-location is related to the corresponding separate portion of the wager.

14. The gaming system of claim 8, wherein the instructions further cause the gaming system to, after receiving the initial selections, place a secondary award marker on at least one computer-selected wheel segment.

15. The gaming system of claim 14, wherein the at least one computer-selected wheel segment is selected according to an optimizing algorithm, the placement of the secondary award marker being variable based on the player-selected wheel segment.

16. A gaming system configured to conduct a wagering game that populates a bonus feature according to player inputs, the gaming system comprising:

one or more input devices;

one or more display devices;

one or more processors; and one or more memory devices storing instructions that, when executed by at least one of the one or more processors, cause the gaming system to:

detect, via one of the one or more input devices, a physical item associated with monetary value that establishes a credit balance displayed on a credit meter;

receive a wager input indicative of a wager from a player drawn on the credit balance that initiates the wagering game;

display a bonus wheel having a plurality of selectable wheel segments and a plurality of stop indicators located at a periphery of the bonus wheel that indicate at least one winning wheel segment;

receive initial selections by the player of a primary award marker and a wheel segment of the plurality of selectable wheel segments, and place the primary award marker on the player-selected wheel segment;

after receiving the initial selections and prior to spinning the bonus wheel to indicate a winning wheel segment of the plurality of selectable wheel segments, place one or more additional award markers on one or more unselected wheel segments of the plurality of wheel segments according to an optimizing algorithm that places the one or more additional award markers so as to distribute any high-value award markers as evenly as possible;

spin and stop the bonus wheel to indicate, via at least one stop indicator of the plurality of stop indicators, a randomly selected winning segment; and in response to the primary award marker being on the randomly selected winning segment indicated by the at least one stop indicator, award the player an award associated with the primary award marker.

17. The gaming system of claim 16, wherein the instructions further cause the gaming system to:

prior to spinning the bonus wheel to indicate a winning wheel segment, receive at least one additional selection from the player of an additional stop indicator of the plurality of stop indicators, wherein the additional selection activates the additional at least one selected stop indicator to indicate a randomly selected winning segment and deactivates the remaining stop indicators of the plurality.

18. The gaming system of claim 16, wherein the instructions further cause the gaming system to:

prior to spinning the bonus wheel to indicate a winning wheel segment, move the stop indicators of the plurality of stop indicators to one or more locations on the periphery of the bonus wheel such that, after stopping the bonus wheel, the plurality of stop indicators indicate a plurality of randomly selected winning wheel segments.

* * * * *